US012803710B2

(12) United States Patent
Prasad et al.

(10) Patent No.: US 12,803,710 B2
(45) **Date of Patent: *Nov. 17, 2026**

(54) DATA PACKET IDENTIFCATION FOR REAL TIME PROCESSING

(71) Applicant: Truist Bank, Charlotte, NC (US)

(72) Inventors: Tekchand Prasad, Alpharetta, GA (US); Suresh Edupuganti, Marietta, GA (US); Sanjeev Kumar Jha, Marietta, GA (US)

(73) Assignee: TRUIST BANK, Charlotte, NC (US)

( * ) Notice: Subject to any disclaimer, the term of this patent is extended or adjusted under 35 U.S.C. 154(b) by 49 days.

This patent is subject to a terminal disclaimer.

(21) Appl. No.: 19/009,662

(22) Filed: Jan. 3, 2025

(65) Prior Publication Data

US 2025/0141600 A1 May 1, 2025

Related U.S. Application Data

(63) Continuation of application No. 18/065,021, filed on Dec. 13, 2022, now Pat. No. 12,206,499.

(51) Int. Cl.
*H04L 1/18* (2023.01)
*H04L 1/1607* (2023.01)

(52) U.S. Cl.
CPC .................................. *H04L 1/1642* (2013.01)

(58) Field of Classification Search
None
See application file for complete search history.

(56) References Cited

U.S. PATENT DOCUMENTS 8,276,035 B1 * 9/2012 Savarese ................. H04L 1/188 714/749
8,717,911 B2 * 5/2014 Bugenhagen ....... H04L 43/0894 370/254
8,743,874 B2 * 6/2014 Kim .................... H04W 28/065 370/392

(Continued)

OTHER PUBLICATIONS

U.S. Appl. No. 18/065,021 , Advisory Action, Mailed on Jan. 30, 2024, 2 pages.

(Continued)

*Primary Examiner* — Mujtaba M Chaudry
(74) *Attorney, Agent, or Firm* — Michael A. Springs, Esq.; Shumaker, Loop & Kendrick, LLP; Patrick B. Horne

(57) ABSTRACT

A computer-implemented method includes receiving one or more data packets. Each data packet can be processed by a real-time processing system or a non-real-time processing system. The method can include generating a first data packet sequence including at least a portion of the one or more data packets. The first data packet sequence can be transmitted to the real-time processing system to process each data packet of the first data packet sequence. Subsequently, a report generated by the real-time processing system can be received. The report can indicate that a subset of the data packets failed to be processed by the real-time processing system. A second data packet sequence including the subset of the data packets indicated in the report can be generated. The second data packet sequence can be transmitted to the non-real-time processing system to process each data packet of the second data packet sequence.

20 Claims, 4 Drawing Sheets

(56) References Cited

U.S. PATENT DOCUMENTS

| | | | | |
|---|---|---|---|---|
| 9,609,543 | B1 * | 3/2017 | Vivanco | H04W 72/0446 |
| 11,202,314 | B2 * | 12/2021 | Xin | H04L 1/0003 |
| 2003/0189943 | A1 * | 10/2003 | Gorti | H04L 47/56 370/330 |
| 2004/0157560 | A1 * | 8/2004 | Yamasaki | H04L 1/0026 455/67.11 |
| 2008/0049747 | A1 * | 2/2008 | McNaughton | H04L 12/6418 370/389 |
| 2017/0346601 | A1 * | 11/2017 | Lee | H04L 1/1874 |
| 2022/0107630 | A1 * | 4/2022 | Zope | G06F 18/231 |
| 2023/0412502 | A1 * | 12/2023 | Kalia | H04L 45/28 |

OTHER PUBLICATIONS

U.S. Appl. No. 18/065,021 , Final Office Action, Mailed on Oct. 30, 2023, 12 pages.
U.S. Appl. No. 18/065,021 , Non-Final Office Action, Mailed on May 24, 2024, 11 pages.
U.S. Appl. No. 18/065,021 , Non-Final Office Action, Mailed on Jul. 5, 2023, 9 pages.
U.S. Appl. No. 18/065,021 , Notice of Allowance, Mailed on Sep. 17, 2024, 5 pages.

* cited by examiner

DATA PACKET IDENTIFCATION FOR REAL TIME PROCESSING

CROSS-REFERENCE TO RELATED APPLICATIONS

The present application is a continuation of U.S. patent application Ser. No. 18/065,021, filed Dec. 13, 2022, titled "DATA PACKET IDENTIFICATION FOR REAL TIME PROCESSING," the entirety of which is incorporated herein by reference.

TECHNICAL FIELD

The present disclosure relates generally to identifying data packets, and more particularly (although not necessarily exclusively), to identifying and processing data packets for transmission to separate destinations.

BACKGROUND

Systems receive data packets, where some of the data packets are to be processed differently from others of the data packets. Further, some data within an individual data packet may be processed in a manner different from other data within the individual data packets. Some of the systems receive large numbers of data packets such that the disparate treatment of data within the data packets may result in significant inefficiencies when processing the data packets. Thus, efficient identification and processing of the data packets is desirable.

SUMMARY

In an example, a computer-implemented method includes receiving one or more data packets, where each data packet can be processed by a real-time processing system or a non-real-time processing system. The method further includes generating a first data packet sequence including at least a portion of the one or more data packets. Additionally, the method includes transmitting the first data packet sequence to the real-time processing system to process each data packet of the first data packet sequence. Further, the method includes, subsequent to transmitting the first data packet sequence to the real-time processing system, receiving a report generated by the real-time processing system indicating that a subset of the data packets of the first data packet sequence failed to be processed by the real-time processing system. The method also includes generating, based on the report, a second data packet sequence including the subset of the data packets indicated in the report. Furthermore, the method includes transmitting the second data packet sequence to the non-real-time processing system to process each data packet of the second data packet sequence.

In an additional example, a server includes a processing device and a non-transitory computer-readable medium that includes instructions that are executable by the processing device to cause the processing device to perform operations. The operations include receiving one or more data packets, where each data packet can be processed by a real-time processing system or a non-real-time processing system. The operations further include generating a first data packet sequence including at least a portion of the one or more data packets. Additionally, the operations include transmitting the first data packet sequence to the real-time processing system to process each data packet of the first data packet sequence. Further, the operations include, subsequent to transmitting the first data packet sequence to the real-time processing system, receiving a report generated by the real-time processing system indicating that a subset of the data packets of the first data packet sequence failed to be processed by the real-time processing system. The operations also include generating, based on the report, a second data packet sequence including the subset of the data packets indicated in the report. Furthermore, the operations include transmitting the second data packet sequence to the non-real-time processing system to process each data packet of the second data packet sequence.

In an additional example, a non-transitory computer-readable medium includes instructions that are executable by a processing device for causing the processing device to perform operations. The operations include receiving one or more data packets, where each data packet can be processed by a real-time processing system or a non-real-time processing system. The operations further include generating a first data packet sequence including at least a portion of the plurality of data packets. Additionally, the operations include transmitting the first data packet sequence to the real-time processing system to process each data packet of the first data packet sequence. Further, the operations include, subsequent to transmitting the first data packet sequence to the real-time processing system, receiving a report generated by the real-time processing system indicating that a subset of the data packets of the first data packet sequence failed to be processed by the real-time processing system. The operations also include generating, based on the report, a second data packet sequence including the subset of the data packets indicated in the report. Furthermore, the operations include transmitting the second data packet sequence to the non-real-time processing system to process each data packet of the second data packet sequence.

DETAILED DESCRIPTION

Certain aspects and examples of the present disclosure relate to efficient processing of data packets, for example, by systems that receive and process large numbers of data packets. In some embodiments, some of the data packets are to be processed differently from others of the data packets, and in some embodiments, fast processing of the data packets is important. Various embodiments of the present disclosure describe concepts and methods of efficiently categorizing data packets for appropriate processing and transmission.

For example, some systems receive data packets that are to be processed by external systems, where the external systems each have differing processing times and capabilities. Some external systems may have the capability of completing the processing of data packets in a manner that is faster than other systems. The completion of the processing may be identified as being performed in "real time." These real-time systems, however, may be capable of processing only certain types of data packets. Accordingly, the data packets not compatible with the real-time processing systems, may be sent to one of a number of non-real-time processing systems. Therefore, to optimize processing efficiency and/or time, each data packet is characterized and sent for processing according to one or more compatibility attributes.

Thus, an advantage of the system of the present disclosure is that a processing system can automatically identify data packets that are compatible with varying external processing systems without user input. In addition, since the external processing systems may rely on data packets of a specific format, the processing system may also efficiently package the data packets into appropriate formats and batches based on the identification of the appropriate external processing systems. Thus, the processing system can perform the data package identification, batching, transmission, and associated actions with reduced processing power than would be needed if the processing system relied on serial data packet processing.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
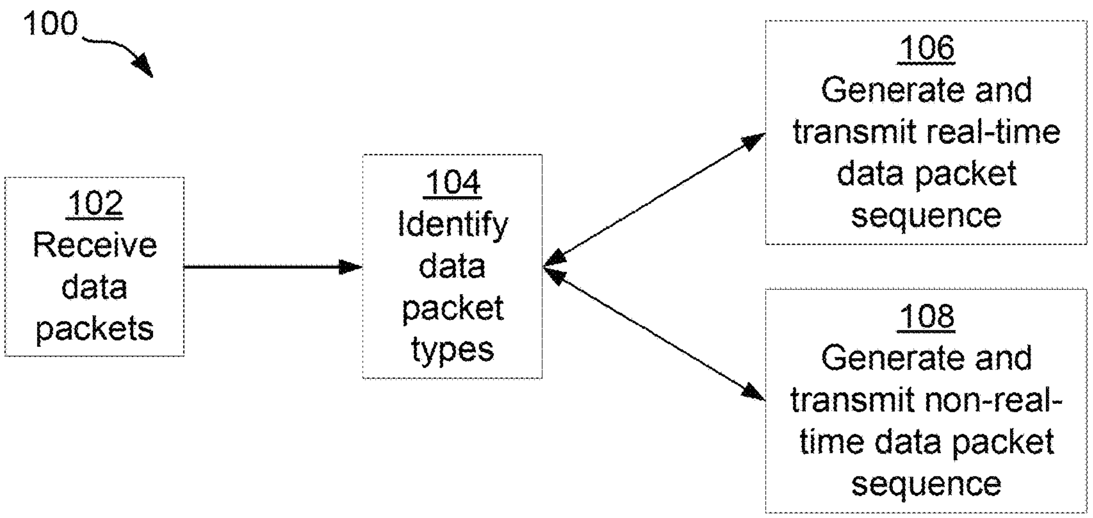
FIG. 1 is a schematic diagram of a data flow according to an example of the present disclosure.

FIG. 1 is a schematic diagram of a data flow 100 according to an example of the present disclosure. In some embodiments, the data flow 100 may be performed by a processing system, such as that described below with reference to FIG. 2. In some examples, the processing system can implement some or all of the blocks shown in FIG. 1. Other embodiments can include more blocks, fewer blocks, different blocks, or a different order of the blocks than is shown in FIG. 1.

At the block 102, the processing system receives a plurality of data packets. In some embodiments, the data packets may be of different identifiable types. For example, in some embodiments, the data packets discussed with reference to FIG. 1 and any of the other figures, each encode data representing or associated with a particular bank transaction or a group of bank transactions to be processed by a data processing system or service. Accordingly, in some embodiments, the data packets are received by the processing system as a file encoding information formatted according to NACHA (National Automated Clearing House Association) standards, as understood by those of ordinary skill in the art.

In some embodiments, the processing system also receives one or more error detection data signals, which encode error detection data. For example, one or more of the error detection data signals may encode information related to a group of the plurality of data packets. In some embodiments, the error detection data signals may be received by the processing system as a Control Total file, as understood by one of skill in the art. In some embodiments, one or more of the error detection data signals may encode one or more hashes, as understood by one of skill in the art, of a group of data packets or portions of a group of data packets.

At block 104, the processing system may use the one or more error detection data signals to validate the received plurality of data packets. For example, the processing system may process the data packets to generate a value and to compare the generated value with information encoded by the error detection data signals. The processing system may be configured to calculate a sum of values from the data packets and/or to calculate a hash of data from the data packets, and to compare the calculated sum and/or hash with the information encoded by the error detection data signals.

At block 104, the processing system may compare each of the data packets with a characterization data sequence. For example, in some embodiments, each of the data packets includes an attribute portion encoding a particular attribute of the data packet, and at block 104, the processing system compares the characterization data sequence with the attribute portion of each of the data packets. In some embodiments, the processing system is configured to compare the information of the attribute portion of each of the data packets with each of a plurality of different characterization data sequences. The comparison of the data packets with the characterization data sequence may identify data packet types that are sufficient for inclusion with real-time processing or non-real-time processing.

At block 106, the processing system generates a first data packet sequence, where the first data packet sequence comprises one or more of the data packets of the received plurality of data packets having attribute portions encoding identical or substantially identical attributes. For example, each of the data packets of the first data packet sequence may include an attribute portion encoding qualification for real-time processing. For example, each of the data packets of the first data packet sequence may include an attribute portion encoding and identity of an entity qualified for batch managed file transfer real-time processing. In some embodiments, the identified entities of different data packets are different. In addition, in some embodiments, the first data packet sequence may include information and may be formatted according to a standard from an international organization for standardization.

At block 106, the processing system also transmits the first data packet sequence to an external real-time processing system or service configured to separately process each of the data packets of the first data packet sequence. For example, in some embodiments, the processing system is configured to transmit the first data packet sequence to a real-time processing service, such as The Clearing House®, where the first data packet sequence has a format compatible with processing at the real-time processing service.

At block 108, the processing system generates a second data packet sequence, where the second data packet sequence comprises one or more of the data packets of the received plurality of data packets having an attribute portion encoding an attribute different from the attribute encoded by the attribute portions of the data packets of the first data packet sequence. For example, each of the data packets of the second data packet sequence may include an attribute portion encoding non-qualification for real-time processing. Each of the data packets of the second data packet sequence may include an attribute portion encoding and identity of an institution not qualified for batch managed file transfer real-time processing. In addition, in some embodiments, the second data packet sequence may include information and may be formatted according to an Automated Clearing House Network (ACH) standard.

At block 108, the processing system also transmits the second data packet sequence to an external non-real-time processing system or service configured to separately process each of the data packets of the second data packet sequence. For example, in some embodiments, the processing system is configured to transmit the second data packet sequence to a non-real-time processing service, such as the ACH network, where the second data packet sequence has a format compatible with processing at the non-real-time processing service.

Figure 2:
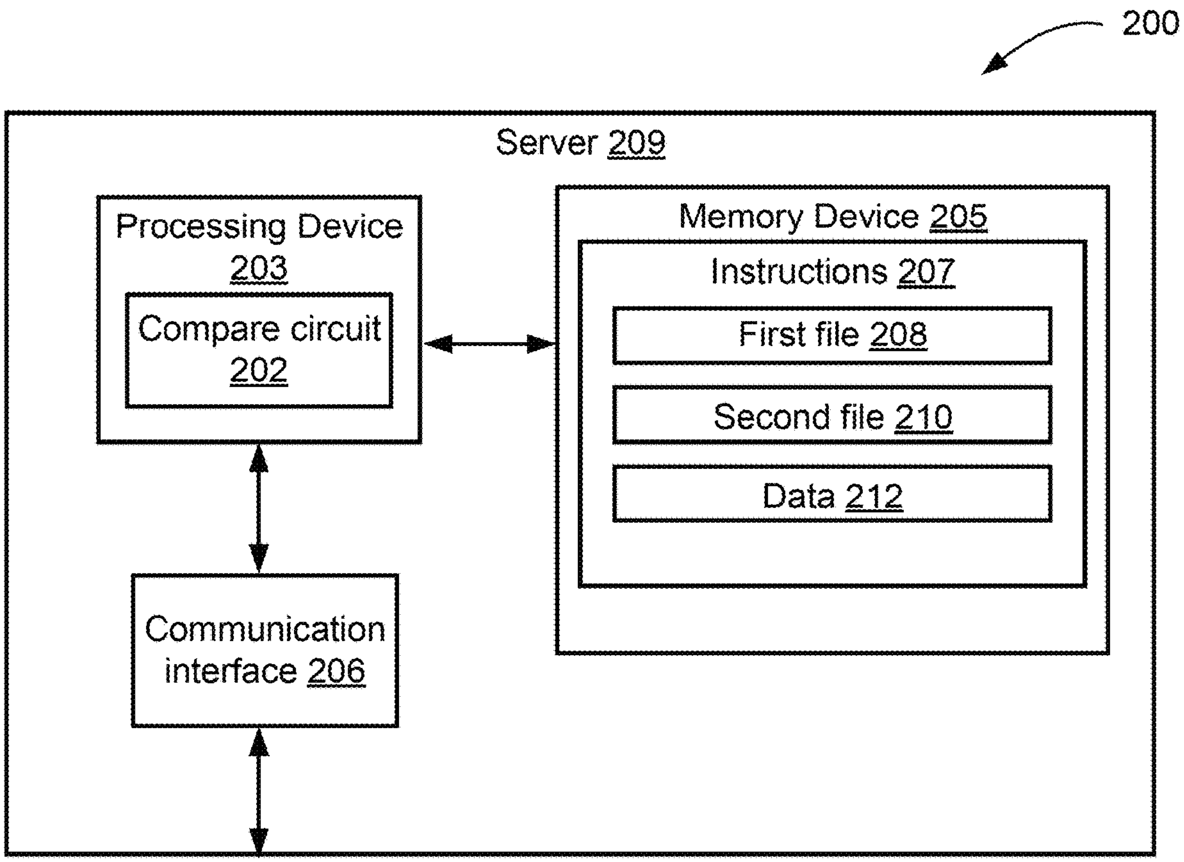
FIG. 2 is a schematic block diagram of a system used to perform operations in the data flow of FIG. 1 according to an example of the present disclosure.

FIG. 2 is a block diagram of an example of a processing system 200 for facilitating the various aspects and features of the methods discussed herein according to one example of the present disclosure. The system 200 includes a processing device 203 that is communicatively coupled to a memory device 205. In some examples, the processing device 203 and the memory device 205 can be part of the same computing device, such as the server 209. In other examples, the processing device 203 and the memory device 205 can be distributed from (e.g., remote to) one another.

The processing device 203 can include one processor or multiple processors. Non-limiting examples of the processing device 203 include a Field-Programmable Gate Array (FPGA), an application-specific integrated circuit (ASIC), or a microprocessor. The processing device 203 can execute instructions 207 stored in the memory device 205 to perform operations. The instructions 207 may include processor-specific instructions generated by a compiler or an interpreter from code written in any suitable computer-programming language, such as C, C++, C#, Java, or Python.

The memory device 205 can include one memory or multiple memories. The memory device 205 can be volatile or non-volatile. Non-volatile memory includes any type of memory that retains stored information when powered off. Examples of the memory device 205 include electrically erasable and programmable read-only memory (EEPROM) or flash memory. At least some of the memory device 205 can include a non-transitory computer-readable medium from which the processing device 203 can read instructions 207. A non-transitory computer-readable medium can include electronic, optical, magnetic, or other storage devices capable of providing the processing device 203 with computer-readable instructions or other program code. Examples of a non-transitory computer-readable medium can include a magnetic disk, a memory chip, ROM, random-access memory (RAM), an ASIC, a configured processor, and optical storage.

The processing device 203 can execute the instructions 207 from memory device 205 to perform operations. For example, the processing device 203 may be configured to receive characterization sequence data 212 from memory device 205, and to provide the characterization sequence data 212 to a compare circuit 202 according to the executed instructions 207. The processing device 203 may be further configured to, according to the executed instructions 207, sequentially receive each of a plurality of data packets, for example, having characteristics similar or identical to the plurality of data packets discussed above with reference to FIG. 1, and to provide an attribute portion of each of the data packets to the compare circuit 202.

In some embodiments, the characterization sequence data 212 comprises a plurality of characterization sequences, and the compare circuit is configured to compare the attribute portion of each of the data packets with each of the characterization sequences, and to provide a signal indicating whether the attribute portion of each of the data packets matches any of the characterization sequences. Processing device 203 may be further configured to, according to the executed instructions 207, generate a first file 208 comprising data of the data packets which match any of the characterization sequences, and to generate a second file 210 comprising data of the data packets which do not match any of the characterization sequences. The processing device 203 may be further configured to, according to the executed instructions 207, transmit the first file 208 to communication interface 206 with a first destination indication, and the communication interface 206 may be configured to transmit the information of the first file 208 to a destination corresponding with the first destination indication. The processing device 203 may be further configured to, according to the executed instructions 207, transmit the second file 210 to communication interface 206 with a second destination indication, and the communication interface 206 may be configured to transmit the information of the second file 210 to a second destination corresponding with the second destination indication.

The communication interface 206 may also be configured to receive data from each of the first and second destinations, and to provide the received data to the processing device 203, where the processing device 203 is configured to, according to the executed instructions 207, process the received data, for example according to inventive methods discussed elsewhere herein.

Figure 3:
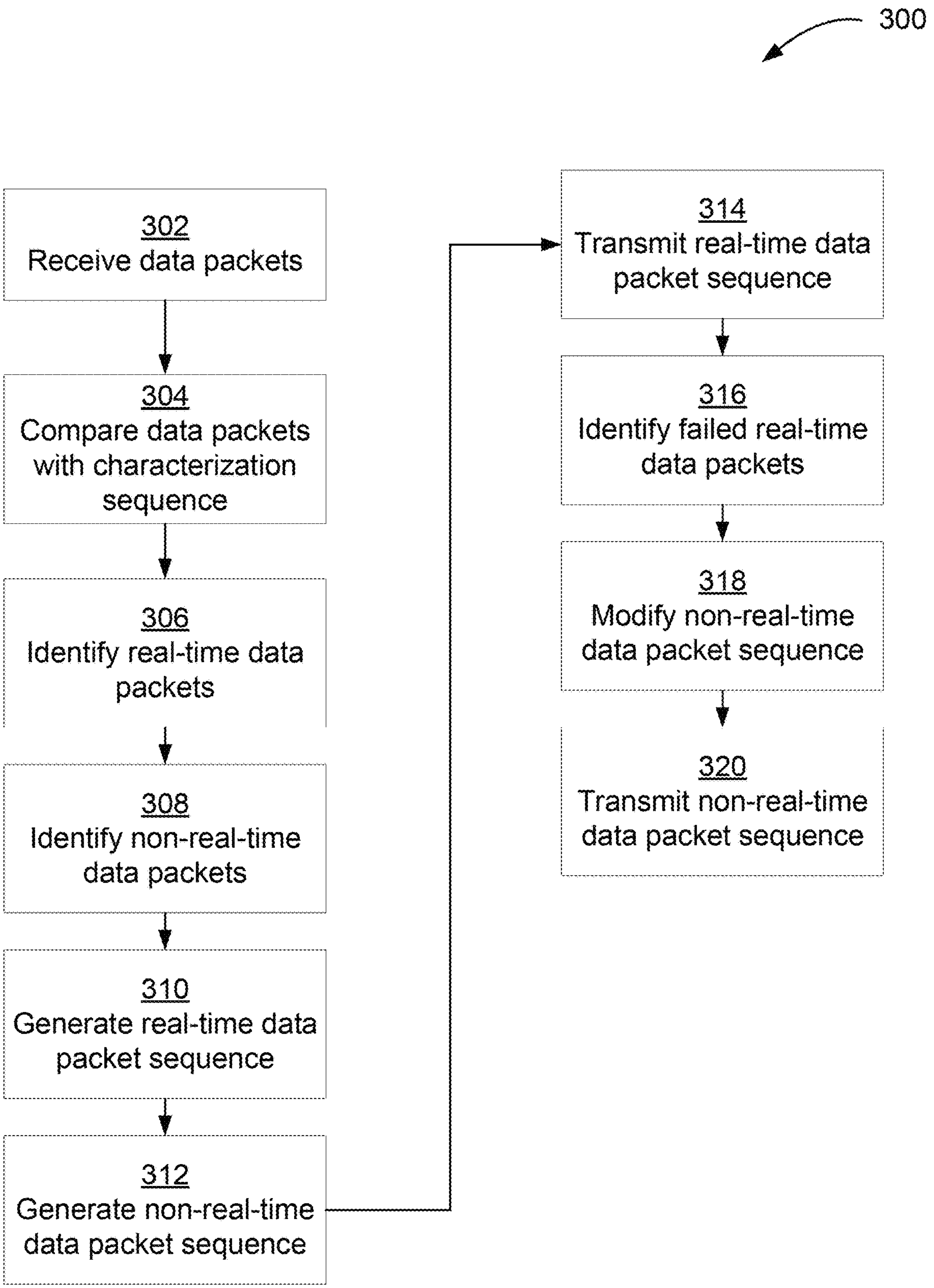
FIG. 3 is a flowchart of a process for transmitting data packets according to an example of the present disclosure.

FIG. 3 is a flowchart of a process 300 for transmitting data packets according to an example of the present disclosure. In some embodiments, the process 300 may be performed by a processing system, such as that described above with reference to FIG. 2 or another processing system. In some examples, the processing system can implement some or all of the blocks shown in FIG. 3. Other embodiments can include more blocks, fewer blocks, different blocks, or a different order of the blocks than is shown in FIG. 3.

At block 302, the processing system receives a plurality of data packets. In some embodiments, the data packets may be of different identifiable types, for example, as discussed elsewhere herein. The data packets may have features similar or identical to those of the data packets discussed above with reference to FIGS. 1 and/or 2.

In some embodiments, the processing system also receives one or more error detection data signals, which encode error detection data. For example, one or more of the error detection data signals may encode information related to a group of the plurality of data packets. The error detection data signals may have features similar or identical to those of the error detection data signals discussed above with reference to FIGS. 1 and/or 2.

At block 304, the processing system is configured to compare each of the data packets with a characterization data sequence having features, for example, similar or identical to the characterization data sequence discussed above with reference to FIGS. 1 and/or 2. For example, in some embodiments, each of the data packets includes an attribute portion encoding a particular attribute of the data packet, and at block 304, the processing system compares the characterization data sequence with the attribute portion of each of the data packets. In some embodiments, the processing system is configured to compare the information of the attribute portion of each of the data packets with each of a plurality of different characterization data sequences, for example using methods similar or identical to those discussed elsewhere herein.

At block 306, the processing system is configured to identify real-time data packets of the plurality of data packets. The processing system is configured to identify as real-time data packets those data packets of the plurality of data packets whose attribute portions match the characterization data sequence, as determined by the comparison performed at block 304, for example, using methods similar or identical to those discussed elsewhere herein.

At block 308, the processing system is configured to identify non-real-time data packets of the plurality of data packets. The processing system is configured to identify as non-real-time data packets those data packets of the plurality of data packets whose attribute portions do not match the characterization data sequence, as determined by the comparison performed at block 304, for example, using methods similar or identical to those discussed elsewhere herein.

At block 310, the processing system is configured to generate a first data packet sequence, where the first data packet sequence comprises those data packets of the received plurality of data packets identified at block 306 as being real-time data packets.

At block 312, the processing system is configured to generate a second data packet sequence, where the second data packet sequence comprises those data packets of the received plurality of data packets identified at block 308 as being non-real-time data packets.

At block 314, the processing system is configured to transmit the first data packet sequence to an external real-time processing system or service configured to separately process each of the data packets of the first data packet sequence.

In response to receiving the first data packet sequence the real-time processing system processes or attempts to process the data packets of the first data packet sequence.

At block 316, the processing system is configured to receive a report from the external real-time processing system, where the report identifies any data packets of the first data packet sequence which the external real-time processing system did not process.

At block 318, the processing system is configured to modify the second data packet sequence by further including those data packets identified by the report received at block 316.

At block 320, the processing system is configured to transmit the second data packet sequence to an external non-real-time processing system or service configured to separately process each of the data packets of the second data packet sequence.

In response to receiving the second data packet sequence the non-real-time processing system processes the data packets of the second data packet sequence.

Figure 4:
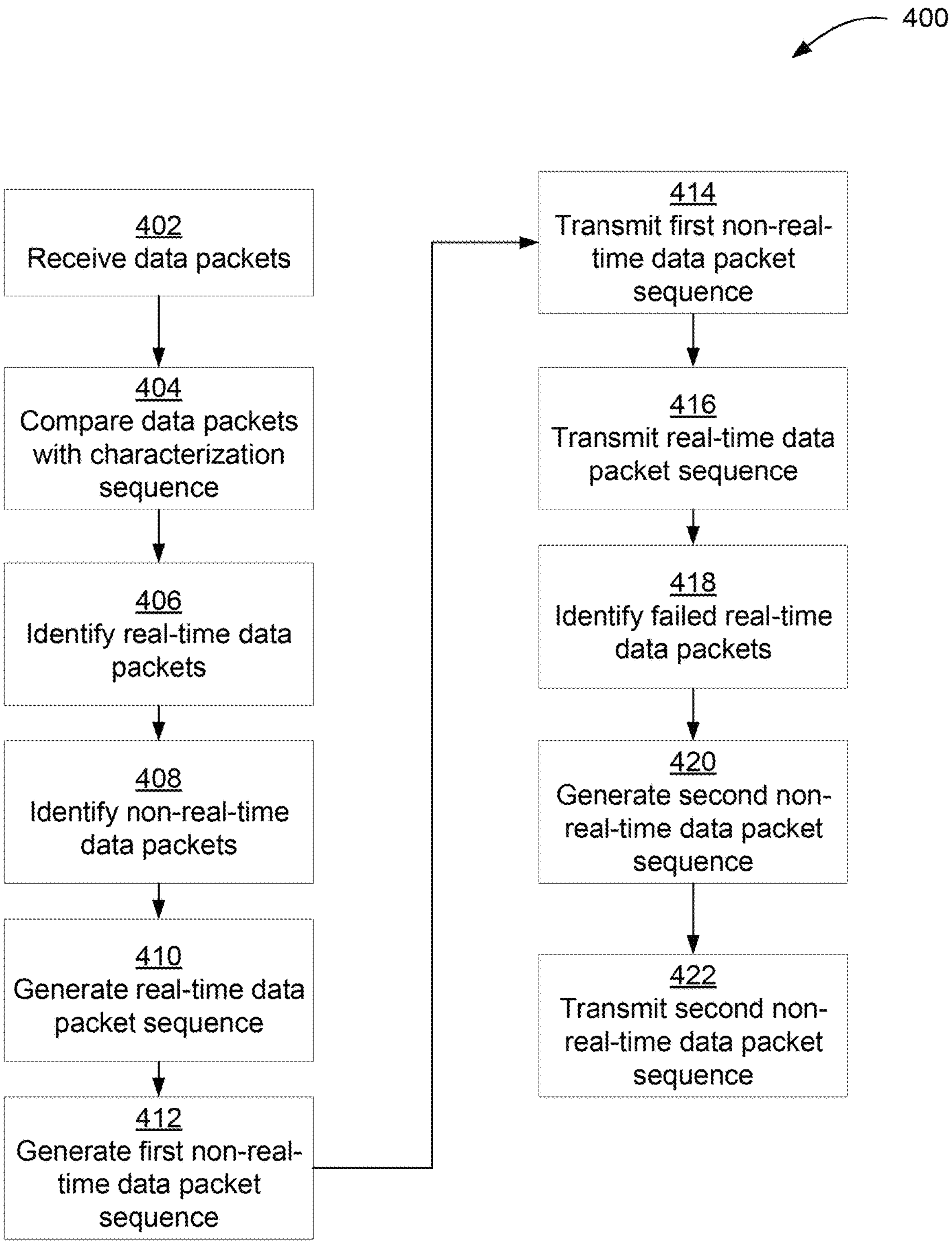
FIG. 4 is a flowchart of an additional process for transmitting data packets according to an example of the present disclosure.

FIG. 4 is a flowchart of a process 400 for transmitting data packets according to an example of the present disclosure. In some embodiments, the process 400 may be performed by a processing system, such as that described above with reference to FIG. 2 or another processing system. In some examples, the processing system can implement some or all of the blocks shown in FIG. 4. Other embodiments can include more blocks, fewer blocks, different blocks, or a different order of the blocks than is shown in FIG. 4.

At block 402, the processing system receives a plurality of data packets. In some embodiments, the data packets may be of different identifiable types, for example, as discussed elsewhere herein. The data packets may have features similar or identical to those of the data packets discussed above with reference to FIGS. 1, 2, and/or 3.

In some embodiments, the processing system also receives one or more error detection data signals, which encode error detection data. For example, one or more of the error detection data signals may encode information related to a group of the plurality of data packets. The error detection data signals may have features similar or identical to those of the error detection data signals discussed above with reference to FIGS. 1, 2 and/or 3.

At block 404, the processing system is configured to compare each of the data packets with a characterization data sequence having features, for example, similar or identical to the characterization data sequence discussed above with reference to FIGS. 1, 2 and/or 3. For example, in some embodiments, each of the data packets includes an attribute portion encoding a particular attribute of the data packet, and at block 404, the processing system compares the characterization data sequence with the attribute portion of each of the data packets. In some embodiments, the processing system is configured to compare the information of the attribute portion of each of the data packets with each of a plurality of different characterization data sequences, for example using methods similar or identical to those discussed elsewhere herein.

At block 406, the processing system is configured to identify real-time data packets of the plurality of data packets. The processing system is configured to identify as real-time data packets those data packets of the plurality of data packets whose attribute portions match the characterization data sequence, as determined by the comparison performed at block 404, for example, using methods similar or identical to those discussed elsewhere herein.

At block 408, the processing system is configured to identify non-real-time data packets of the plurality of data packets. The processing system is configured to identify as non-real-time data packets those data packets of the plurality of data packets whose attribute portions do not match the characterization data sequence, as determined by the comparison performed at block 404, for example, using methods similar or identical to those discussed elsewhere herein.

At block 410, the processing system is configured to generate a first data packet sequence, where the first data packet sequence comprises those data packets of the received plurality of data packets identified at block 406 as being real-time data packets.

At block 412, the processing system is configured to generate a second data packet sequence, where the second data packet sequence comprises those data packets of the received plurality of data packets identified at block 408 as being non-real-time data packets.

At block 414 the processing system is configured to transmit the second data packet sequence to an external non-real-time processing system or service configured to separately process each of the data packets of the second data packet sequence.

In response to receiving the second data packet sequence the non-real-time processing system processes or attempts to process the data packets of the second data packet sequence.

At block 416 the processing system is configured to transmit the first data packet sequence to an external real-time processing system or service configured to separately process each of the data packets of the first data packet sequence.

In response to receiving the first data packet sequence the real-time processing system processes or attempts to process the data packets of the first data packet sequence.

At block 418, the processing system is configured to receive a report from the external real-time processing system, where the report identifies any data packets of the first data packet sequence which the external real-time processing system did not process.

At block 420, the processing system is configured to generate a third data packet sequence, where the third data packet sequence comprises those data packets identified by the report received at block 418.

At block 422, the processing system is configured to transmit the third data packet sequence to the external non-real-time processing system or service configured to separately process each of the data packets of the third data packet sequence.

In response to receiving the second data packet sequence the non-real-time processing system processes the data packets of the third data packet sequence.

Figure 5:
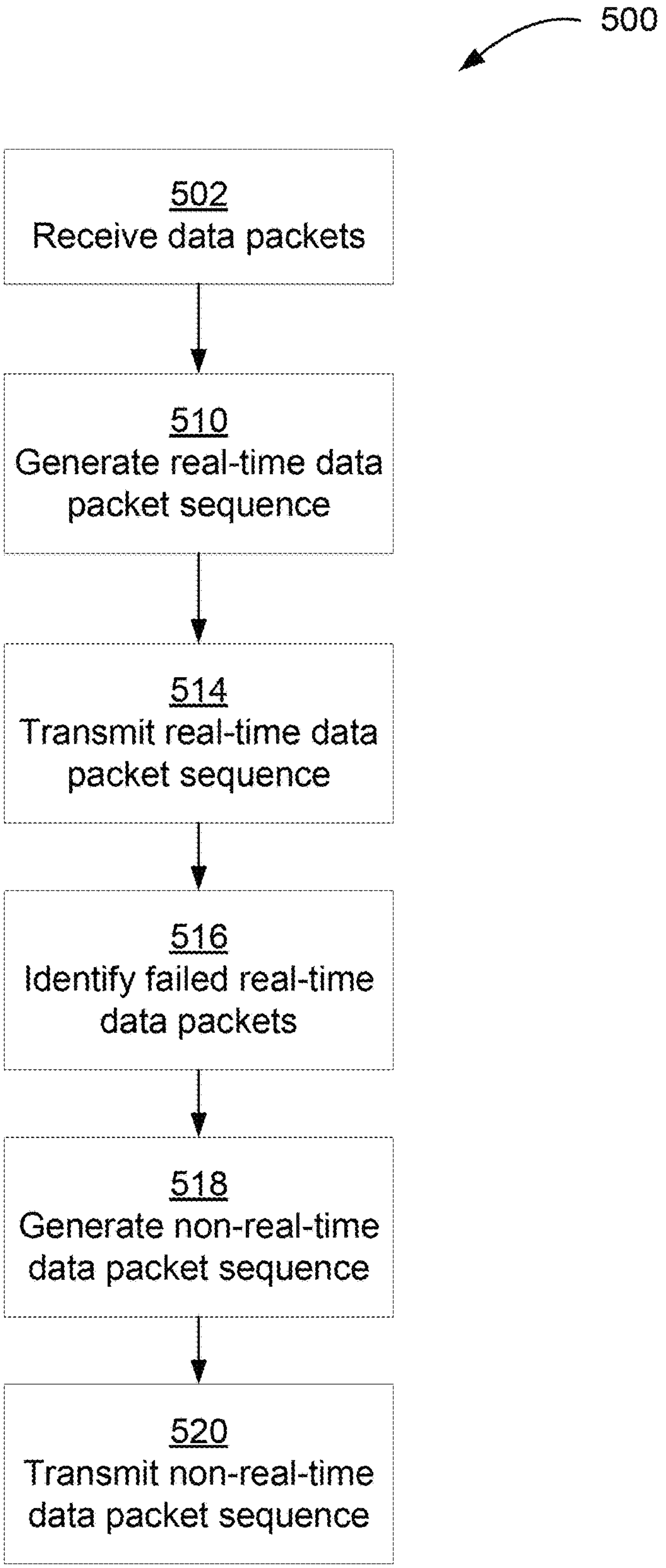
FIG. 5 is a flowchart of an additional process for transmitting data packets according to an example of the present disclosure.

FIG. 5 is a flowchart of a process 500 for transmitting data packets according to an example of the present disclosure. In some embodiments, the process 500 may be performed by a processing system, such as that described above with reference to FIG. 2 or another processing system. In some examples, the processing system can implement some or all of the blocks shown in FIG. 5. Other embodiments can include more blocks, fewer blocks, different blocks, or a different order of the blocks than is shown in FIG. 5.

At the block 502, the processing system receives a plurality of data packets. In some embodiments, the data packets may be of different identifiable types, for example, as discussed elsewhere herein. The data packets may have features similar or identical to those of the data packets discussed above with reference to FIGS. 1, 2, 3 and/or 4.

In some embodiments, the processing system also receives one or more error detection data signals, which encode error detection data. For example, one or more of the error detection data signals may encode information related to a group of the plurality of data packets. The error detection data signals may have features similar or identical to those of the error detection data signals discussed above with reference to FIGS. 1, 2, 3 and/or 4.

At block 510, the processing system is configured to generate a first data packet sequence, where the first data packet sequence comprises some or all of the data packets of the received plurality of data packets.

At block 514, the processing system is configured to transmit the first data packet sequence to an external real-time processing system or service configured to separately process each of the data packets of the first data packet sequence.

In response to receiving the first data packet sequence the real-time processing system processes or attempts to process the data packets of the first data packet sequence.

At block 516, the processing system is configured to receive a report from the external real-time processing system, where the report identifies any data packets of the first data packet sequence that the external real-time processing system did not process. In other words, the processing system identifies any data packets that were failed by the real-time processing system.

At block 518, the processing system is configured to generate a second data packet sequence, where the second data packet sequence comprises those data packets of the received plurality of data packets identified in the report received at block 516.

At block 520, the processing system is configured to transmit the second data packet sequence to an external non-real-time processing system or service configured to separately process each of the data packets of the second data packet sequence.

In response to receiving the second data packet sequence the non-real-time processing system processes the data packets of the second data packet sequence.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method comprising:

receiving a plurality of data packets, each data packet of the plurality of data packets processable by a real-time processing system or a non-real-time processing system;

generating a first data packet sequence comprising at least a portion of the plurality of data packets;

transmitting the first data packet sequence to the real-time processing system to process each data packet of the first data packet sequence;

subsequent to transmitting the first data packet sequence to the real-time processing system, receiving a report generated by the real-time processing system indicating that a subset of the data packets of the first data packet sequence failed to be processed by the real-time processing system;

generating, based on the report, a second data packet sequence comprising the subset of the data packets indicated in the report; and transmitting the second data packet sequence to the non-real-time processing system to process each data packet of the second data packet sequence.

2. The computer-implemented method of claim 1, wherein each particular data packet of the plurality of data packets comprises a respective attribute portion indicating a respective attribute of the particular data packet, and wherein the computer-implemented method further comprises, subsequent to receiving the plurality of data packets:

comparing at least a portion of each of the data packets with a characterization sequence by decoding the respective attribute portion of each particular data packet and comparing the decoded attribute portion with the characterization sequence.

3. The computer-implemented method of claim 2, wherein the respective attribute portion of each data packet of the plurality of data packets indicates an identity of a respective entity.

4. The computer-implemented method of claim 3, wherein the characterization sequence comprises one or more identities of entities qualified for real-time processing, and wherein comparing the portion of each of the data packets with the characterization sequence comprises determining whether the entity of the respective attribute portion matches at least one of the one or more identities of the characterization sequence.

5. The computer-implemented method of claim 1, wherein each data packet of the plurality of data packets has a first format compatible with processing at the real-time processing system or a second format compatible with processing at the non-real-time processing system.

6. The computer-implemented method of claim 1, further comprising:

receiving one or more error detection data signals comprising information related to a portion of the plurality of the data packets; and validating, using the one or more error detection data signals, the plurality of data packets.

7. The computer-implemented method of claim 6, wherein validating the plurality of data packets comprises:

processing at least the portion of the plurality of the data packets to generate a value; and comparing the generated value with the information received as part of the one or more error detection data signals.

8. A server comprising:

a processing device; and a non-transitory computer-readable medium comprising instructions that are executable by the processing device to cause the processing device to:

receive a plurality of data packets, each data packet of the plurality of data packets processable by a real-time processing system or a non-real-time processing system;

generate a first data packet sequence comprising at least a portion of the plurality of data packets;

transmit the first data packet sequence to the real-time processing system to process each data packet of the first data packet sequence;

subsequent to transmitting the first data packet sequence to the real-time processing system, receive a report generated by the real-time processing system indicating that a subset of the data packets of the first data packet sequence failed to be processed by the real-time processing system;

generate, based on the report, a second data packet sequence comprising the subset of the data packets indicated in the report; and transmit the second data packet sequence to the non-real-time processing system to process each data packet of the second data packet sequence.

9. The server of claim 8, wherein each particular data packet of the plurality of data packets comprises a respective attribute portion indicating a respective attribute of the particular data packet, and wherein the instructions are further executable to cause the processing device to, subsequent to receiving the plurality of data packets:

compare at least a portion of each of the data packets with a characterization sequence by decoding the respective attribute portion of each particular data packet and comparing the decoded attribute portion with the characterization sequence.

10. The server of claim 9, wherein the respective attribute portion of each data packet of the plurality of data packets indicates an identity of a respective entity.

11. The server of claim 10, wherein the characterization sequence comprises one or more identities of entities qualified for real-time processing, and wherein comparing the portion of each of the data packets with the characterization sequence comprises determining whether the entity of the respective attribute portion matches at least one of the one or more identities of the characterization sequence.

12. The server of claim 8, wherein each data packet of the plurality of data packets has a first format compatible with processing at the real-time processing system or a second format compatible with processing at the non-real-time processing system.

13. The server of claim 8, wherein the instructions are further executable to cause the processing device to:

receive one or more error detection data signals comprising information related to a portion of the plurality of the data packets; and validate, using the one or more error detection data signals, the plurality of data packets.

14. The server of claim 13, wherein validating the plurality of data packets comprises:

processing at least the portion of the plurality of the data packets to generate a value; and comparing the generated value with the information received as part of the one or more error detection data signals.

15. A non-transitory computer-readable medium comprising instructions that are executable by a processing device for causing the processing device to:

receive a plurality of data packets, each data packet of the plurality of data packets processable by a real-time processing system or a non-real-time processing system;

generate a first data packet sequence comprising at least a portion of the plurality of data packets;

transmit the first data packet sequence to the real-time processing system to process each data packet of the first data packet sequence;

subsequent to transmitting the first data packet sequence to the real-time processing system, receive a report generated by the real-time processing system indicating that a subset of the data packets of the first data packet sequence failed to be processed by the real-time processing system;

generate, based on the report, a second data packet sequence comprising the subset of the data packets indicated in the report; and transmit the second data packet sequence to the non-real-time processing system to process each data packet of the second data packet sequence.

16. The non-transitory computer-readable medium of claim 15, wherein each particular data packet of the plurality of data packets comprises a respective attribute portion indicating a respective attribute of the particular data packet, and wherein the instructions are further executable to cause the processing device to, subsequent to receiving the plurality of data packets:

compare at least a portion of each of the data packets with a characterization sequence by decoding the respective attribute portion of each particular data packet and comparing the decoded attribute portion with the characterization sequence.

17. The non-transitory computer-readable medium of claim 16, wherein the respective attribute portion of each data packet of the plurality of data packets indicates an identity of a respective entity.

18. The non-transitory computer-readable medium of claim 17, wherein the characterization sequence comprises one or more identities of entities qualified for real-time processing, and wherein comparing the portion of each of the data packets with the characterization sequence comprises determining whether the entity of the respective attribute portion matches at least one of the one or more identities of the characterization sequence.

19. The non-transitory computer-readable medium of claim 15, wherein each data packet of the plurality of data packets has a first format compatible with processing at the real-time processing system or a second format compatible with processing at the non-real-time processing system.

20. The non-transitory computer-readable medium of claim 15, wherein the instructions are further executable to cause the processing device to:

receive one or more error detection data signals comprising information related to a portion of the plurality of the data packets; and validate, using the one or more error detection data signals, the plurality of data packets.

* * * * *